United States Patent
Guan et al.

(10) Patent No.: US 7,245,619 B1
(45) Date of Patent: Jul. 17, 2007

(54) METHOD AND APPARATUS FOR MANAGING ROUTES

(75) Inventors: Tao Guan, Sunnyvale, CA (US); Leo Huber, Mountain View, CA (US); Michael Yip, Sunnyvale, CA (US)

(73) Assignee: Extreme Networks, Santa Clara, CA (US)

( * ) Notice: Subject to any disclaimer, the term of this patent is extended or adjusted under 35 U.S.C. 154(b) by 1090 days.

(21) Appl. No.: 10/160,141

(22) Filed: May 31, 2002

(51) Int. Cl.
*H04L 12/28* (2006.01)
*H04L 12/56* (2006.01)
*G06F 15/173* (2006.01)

(52) U.S. Cl. .................. 370/392; 370/389; 709/242
(58) Field of Classification Search ............. None
See application file for complete search history.

(56) References Cited

U.S. PATENT DOCUMENTS

| | | | |
|---|---|---|---|
| 6,304,556 B1 * | 10/2001 | Haas | 370/254 |
| 6,327,251 B1 * | 12/2001 | Bion | 370/255 |
| 6,857,026 B1 * | 2/2005 | Cain | 709/239 |
| 6,950,510 B2 * | 9/2005 | Enzmann et al. | 379/265.11 |
| 7,007,100 B1 * | 2/2006 | Doong et al. | 709/238 |

* cited by examiner

*Primary Examiner*—Chi Pham
*Assistant Examiner*—Ronald Abelson
(74) *Attorney, Agent, or Firm*—Blakely Sokoloff Taylor & Zafman

(57) ABSTRACT

A method and apparatus for managing routes. A route manager receives a route to a destination, the route having been discovered by a routing protocol application. The route manager maintains the route in a route table and distributes the route to a second routing protocol application. In addition, the route manager maintains a subset of the routes in a second route table and distributes routes to a subsidiary application not having access to the routing protocol applications. The route manager recovers routes when a routing protocol application becomes inoperable by setting a timer when the routing protocol application becomes inoperable and purging routes when the route manager cannot confirm the routes upon expiration of the timer.

51 Claims, 5 Drawing Sheets

US 7,245,619 B1

METHOD AND APPARATUS FOR MANAGING ROUTES

FIELD

The present invention relates to the field of computer networks and internetworking communications technologies. More particularly, the present invention relates to managing route tables in a packet-forwarding device.

BACKGROUND

A network is a group of two or more network-accessible devices linked by wired or wireless connections. A network-accessible device is a computer system, e.g., a desktop computer, a personal digital assistant, a mobile or laptop computer, a cellular or mobile telephone, etc., that is accessible by or over a network.

Typically, data (a packet) travels through numerous points during transmission from an originating computer system (a source) to a destination computer system (a destination). A router is a packet-forwarding device that determines the next point to which a packet is forwarded along a route to a destination. In order to determine the next point, the router accesses a route table. The route table includes entries corresponding to the next points to which packets are forwarded along routes to different destinations in the network. A route table may include many routes to a given destination.

Routing protocol applications provide the routes included in the routing table. A routing protocol application is an application running on a router that discovers routes to different destinations from its peers in the network, e.g., open shortest path first (OSPF), routing information protocol (RIP) and border gateway protocol (BGP). See, e.g., Internet Engineering Task Force (IETF) Network Working Group, Request for Comments (RFC) 2328, "OSPF Version 2" April 1998; IETF Network Working Group, RFC 1775, "A Border Gateway Protocol 4 (BGP-4)", March 1995; IETF Network Working Group, RFC 2453 "RIP Version 2" November 1998. When a route is discovered or an existing route disappears, a routing protocol application running on one router transmits the information to its peers so that all of the routers in the network include the same routing information. For example, OSPF running on one router discovers a new route and transmits the new route to other routers in the network, which use the route to update their route tables.

The different routing protocol applications are typically integrated into a single program. The router maintains a single route table of routes discovered by each routing protocol application. The routing protocol applications may access all routes, including those they did not discover, by accessing a common memory.

A drawback to integrating the routing protocol applications into a single program is that it creates a single point of failure, i.e., when one routing protocol application is inoperable (e.g., because the routing protocol application is being updated or there is a problem with the routing protocol application), the entire router is inoperable. An alternative approach is to run each routing protocol application as an independent process. As a result, when one routing protocol application is inoperable, it only affects that routing protocol application, rather than the entire router. However, when routing protocol applications run as independent processes, they do not have access to a common memory. Consequently, a routing protocol application is not able to access routes discovered by other routing protocol applications.

SUMMARY

According to one aspect of the invention, a route manager receives routes from routing protocol applications that discover the routes, and maintains the routes in a route table.

According to one aspect of the invention, the route manager distributes routes received from one routing protocol application to other routing protocol applications and distributes all or a subset of the routes to other applications that cannot independently discover the routes or communicate directly with the routing protocol applications.

According to one aspect of the invention, the route manager recovers routes in a route table should any of the routing protocol applications become inoperable. When the route manager cannot confirm one or more of a routing protocol application's routes upon expiration of a timer, the route manager purges the routes that the route manager cannot confirm.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods.

BRIEF DESCRIPTION OF THE DRAWINGS

The invention is illustrated by way of example, and not by way of limitation, in the figures of the accompanying drawings that are used to illustrate embodiments of the invention, in which like reference numerals refer to similar elements.

DETAILED DESCRIPTION

In the following description various aspects of the present invention, a method and apparatus for a route manager, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known architectures, steps, and techniques have not been shown to avoid unnecessarily obscuring the present invention. For example, specific details are not provided as to whether the method and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system or a packet forwarding device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
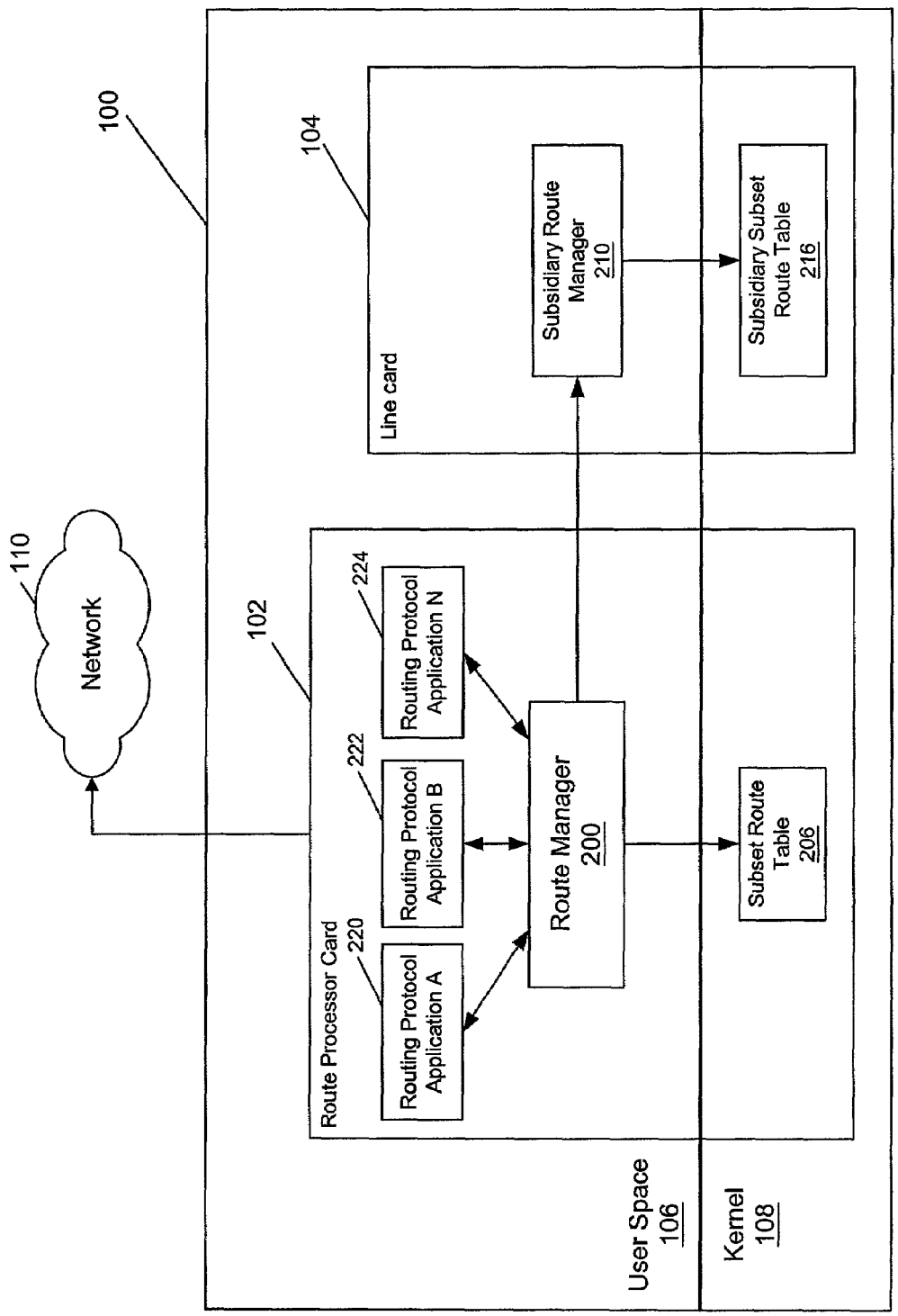
FIG. 1 is a block diagram illustrating certain aspects of a router and an operating environment for a route manager in accordance with one embodiment of the invention.

FIG. 1 is a block diagram illustrating certain aspects of a router and an operating environment for a route manager in accordance with one embodiment of the invention. A router 100 is connected to network 110. Router 100 includes a route processor card 102. Route processor card 102 includes route manager 200 and other components for receiving routes from routing protocol applications. As will be explained in more detail below, route manager 200 receives from routing protocol application A 220, routing protocol application B 222, through routing protocol applications N 224 representing any number N of routing protocol applications, routes to destinations in network 110 and maintains the routes in a route table. As will be explained in more detail below, route manager 200 also distributes routes received from each of the routing protocol applications to each of the other routing protocol applications, determines a subset of routes and distributes the subset of routes to subset route table 206.

Router 100 also includes line card 104, which is added to router 100 via an expansion slot in router 100. There is no requirement or restriction regarding the number of line cards 104 that may be added to router 100. Line card 104 includes subsidiary route manager 210 and other components for carrying out packet-forwarding operations to a destination in a network such as network 110. As will be explained in more detail below, route manager 200 distributes a subset of routes to a subsidiary route manager, which maintains the distributed routes in a subsidiary route table 212 and in a subsidiary subset route table 214.

Router 100 includes user space 106 and kernel space 108. User space 106 is where interactions between applications, such as route manager 200 and routing protocol applications or route manager 200 and subsidiary route manager 210, result in a route table. Kernel space 108 is where router 100 determines where to forward a packet and where actual packet-forwarding occurs from router 100 to the next point along a route to a network destination.

Figure 2:
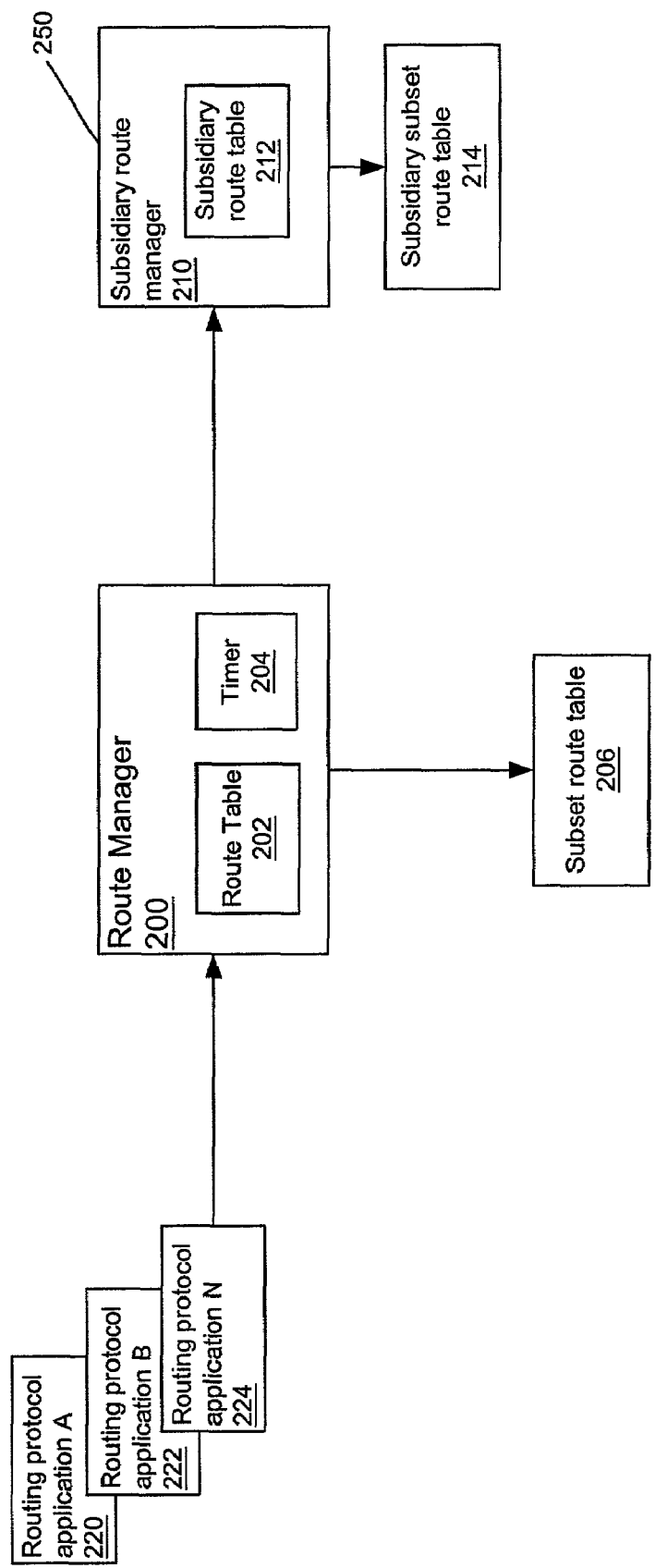
FIG. 2 is a block diagram illustrating a router incorporating a route manager in accordance with one embodiment of the invention.

FIG. 2 is a block diagram illustrating router 100 incorporating a route manager 200 in accordance with one embodiment of the invention. As shown, route manager 200 includes a route table 202 and a timer 204. Route manager 200 is responsible for managing routes to other destinations in the network or internetwork to which router 100 is connected. Routing protocol application A 220, routing protocol application B 222, through routing protocol applications N 224 discover the routes and communicate the routes to route manager 200. For example, routing protocol application A 220 may discover a plurality of routes and transfer the discovered routes in bulk to route manager 200, which uses the routes to populate route table 202.

Route manager 200 manages the routes by maintaining the routes in route table 202. In one embodiment, route table 202 includes an entry for every route to every known network destination which routing protocol application A 220, routing protocol application B 222, through routing protocol applications N 224 learn. Among other things, each route table 202 entry describes a particular route to the destination, a cost associated with that route (e.g. a metric of the number of hops to the destination), and the origin of that route, i.e., the identity of the protocol that discovered the route (e.g. OSPF, RIP, or BGP, etc.). In one embodiment, route table 202 is located in user space 106 of router 100.

Route manager 200 further manages the routes by re-distributing the routes among interested routing protocol application A 220, routing protocol application B 222, through routing protocol applications N 224. An interested routing protocol application is any of routing protocol application A 220, routing protocol application B 222, through routing protocol applications N 224 that has previously registered with route manager 200. The interested routing protocol applications may or may not avail themselves of the re-distributed routes, depending on their individual configurations. For example, the OSPF protocol application may have been configured to enable or disable the exporting of RIP, BGP static and direct (interface) routes.

Route manager 200 further manages the routes by maintaining all or a subset of the routes in a route table other than route table 202. In one embodiment, the other route table is subset route table 206, which receives a subset of the routes contained in route table 202. In one embodiment, subset route table 206 is located in kernel space 108 of router 100 and is used for the highest-speed routing of packets in router 100.

In one embodiment, the subset of routes is a set of preferred routes. A preferred route is a route that, based on certain criteria (e.g. a metric of the number of hops to a destination), is the best route to a destination. According to an alternative embodiment, the subset of routes is a set of routes defined by an application. For example, when the application registers with the route manager, the application may request all routes to a particular destination, or the preferred route to one or more destinations. It should be understood by one of ordinary skill in the art that other subsets of routes may be defined by the applications without departing from the scope of the invention.

Route manager 200 further manages the routes by distributing all or a subset of the routes to another application 250 that need access to the routes but which cannot independently discover routes or communicate directly with the routing protocol applications, which is able to discover routes. Other application 250 maintains the distributed routes in its own route table(s).

In one embodiment, the other application 250 is subsidiary route manager 210. Route manager 200 distributes a subset of the routes in route table 202 to subsidiary route manager 210. In one embodiment, the subset of routes is a set of routes in a network that line card 104, which includes subsidiary route manager 210, supports. Subsidiary route manager 210 maintains distributed routes in subsidiary route table 212. For example, subsidiary route manager 200 transfers a subset of the routes in route table 202 in bulk to subsidiary route manager 200, which uses the routes to populate subsidiary route table 212. Subsidiary route manager 210 may also maintain subsidiary subset route table 214, which contains a further subset (e.g., a set of preferred routes in a network that line card 104 supports) of the distributed routes contained in subsidiary route table 212.

Route manager 200 further manages the routes by recovering routes in route table 202 should any of routing protocol application A 220, routing protocol application B 222, through routing protocol applications N 224 become inoperable. One or more of routing protocol application A 220, routing protocol application B 222, through routing protocol applications N 224 may become temporarily inoperable for a number of reasons, including application errors, system upgrades, hardware errors, etc. Regardless of the reason, once any of routing protocol application A 220, routing protocol application B 222, through routing protocol applications N 224 is inoperable, the routes previously discovered by that routing protocol application are at risk of becoming unreliable since the routing protocol application is unable to monitor the viability of the previously discovered routes. For example, after the OSPF protocol application goes down, one or more of the previously discovered OSPF routes may disappear due to broken links or problems with the OSPF peers on other routers. If the OSPF protocol application does not restart within a certain period of time, it will not detect the disappearance of the routes and the route will remain in route table 202 even though it is no longer a valid route.

In order to avoid problems with invalid routes in route table 202, route manager 200 starts a timer 204 when any of routing protocol application A 220, routing protocol application B 222, through routing protocol applications N 224 becomes inoperable. As will be discussed in more detail below, upon the expiration of timer 204, route manager 200 attempts to confirm whether the routes are still valid. When route manager 200 is not able to confirm that the routes are still valid, route manager 200 purges from route table 202 all routes that route manager 200 cannot confirm.

Figure 3:
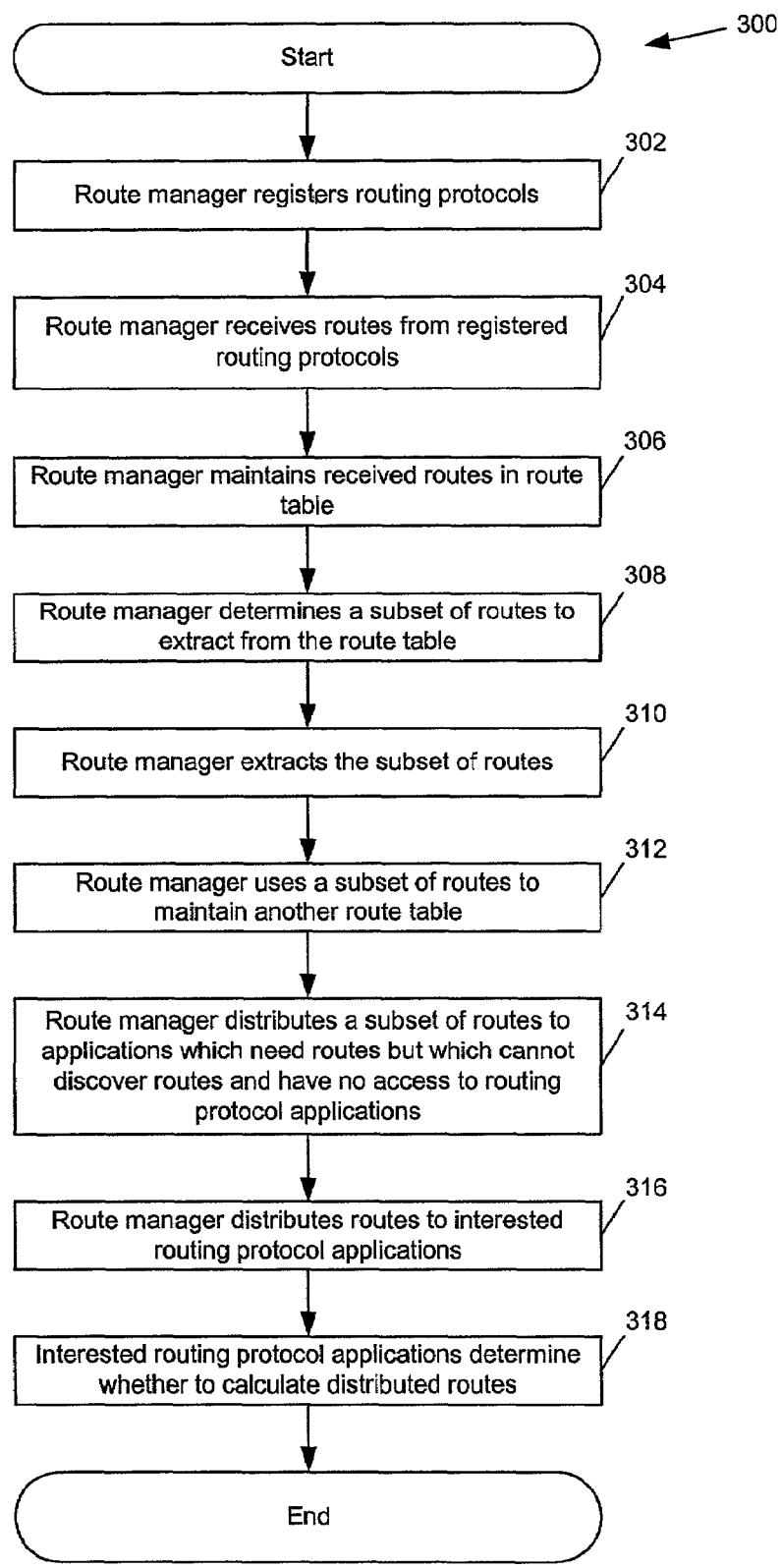
FIG. 3 is a flow diagram illustrating certain aspects of a method to be performed by a router incorporating a route manager in accordance with one embodiment of the invention illustrated in FIG. 1 and FIG. 2.
Figure 4:
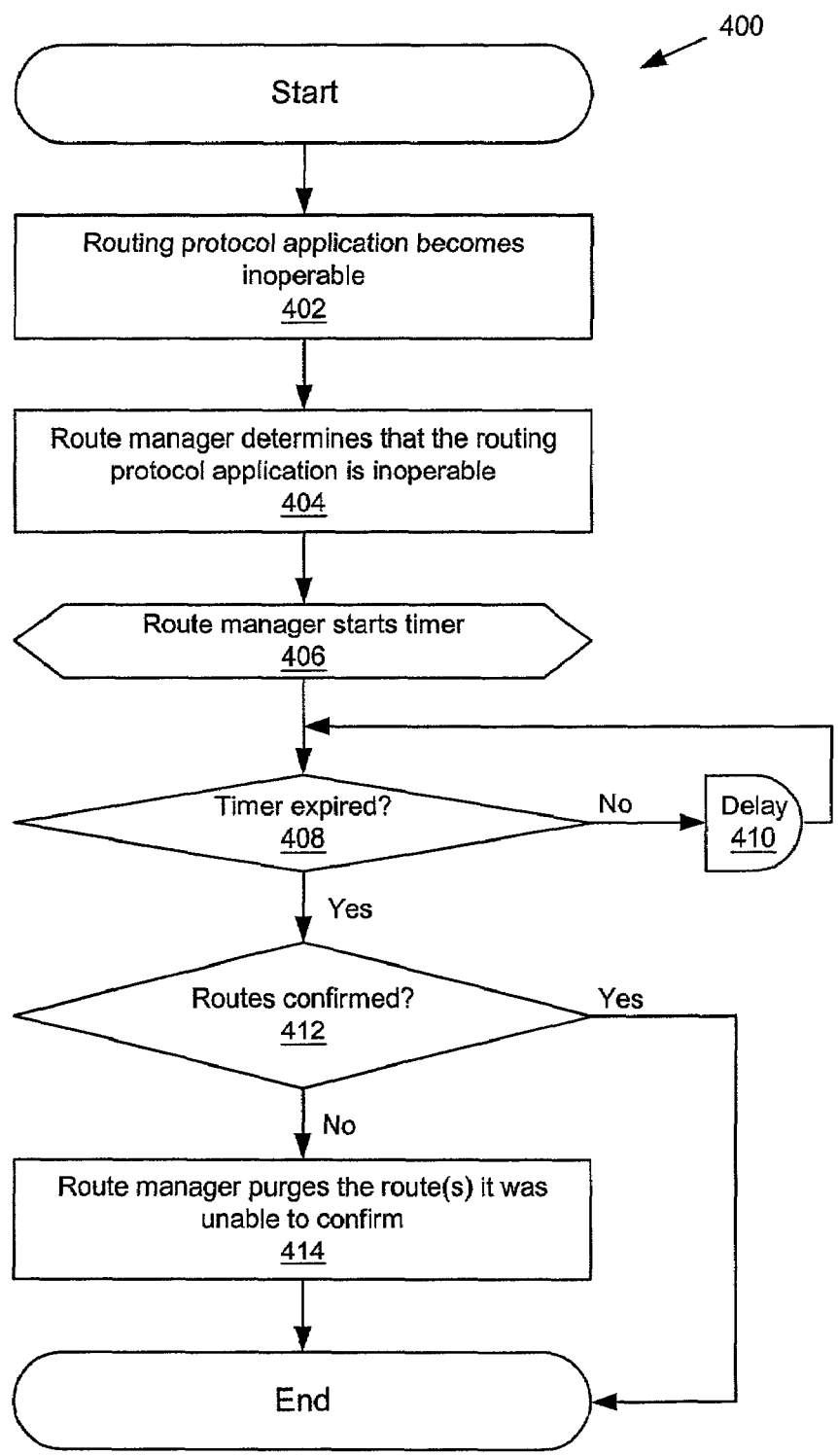
FIG. 4 is a flow diagram illustrating certain other aspects of a method to be performed by a router incorporating a route manager in accordance with one embodiment of the invention illustrated in FIG. 1, FIG. 2 and FIG. 3.

Turning now to FIG. 3 and FIG. 4, the particular methods of an embodiment of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings of the embodiments of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or produce a result.

FIG. 3 is a flow diagram illustrating certain aspects of a method to be performed by router 100 incorporating route manager 200 in accordance with one embodiment of the invention illustrated in FIG. 1 and FIG. 2. At processing block 302 of method 300, route manager 200 registers routing protocol applications, e.g., routing protocol application A 220, routing protocol application B 222, through routing protocol application N 224, which thereby become interested routing protocol applications. There is no requirement or restriction regarding the number of routing protocols that may register with route manager 200. Registering an application involves identifying or associating one application (e.g., route manager 200) with another application (e.g., a routing protocol application). Registering an application is known to those of ordinary skill in the art, and thus will not be discussed further except as it pertains to embodiments of the present invention.

At processing block 304, route manager 200 receives routes from registered routing protocol applications, which discovered the routes. At processing block 306, route manager 200 maintains routes received from each registered routing protocol application in route table 202.

At processing block 308, route manager 200 determines a subset of routes to extract from route table 202 (e.g., a set of best routes, or a set of routes defined by an application when the application registered with route manager 200). At processing block 310, route manager 200 extracts the subset of routes from route table 202. At processing block 312, route manager 200 maintains a subset of routes in another route table, e.g., subset route table 206. At processing block 314, route manager 200 distributes a subset of routes to an other application 250 (e.g., a subsidiary route manager) which needs the routes but cannot discover routes and which does not have direct access to the routing protocol applications. When a route in a distributed subset of routes changes (e.g., a route becomes invalid), route manager 200 provides updated routes to the other application 250.

At processing block 316, route manager 200 distributes to each interested routing protocol application the routes received from each of the other registered routing protocol applications. At processing block 318, the interested routing protocol applications determine whether to calculate the corresponding route discovered by another routing protocol application.

FIG. 4 is a flow diagram illustrating certain other aspects of a method to be performed by router 100 incorporating route manager 200 in accordance with one embodiment of the invention illustrated in FIG. 1, FIG. 2 and FIG. 3. As introduced previously, route manager 200 recovers routes corresponding to a routing protocol application that becomes inoperable. At processing block 402 of method 400, a registered routing protocol application becomes inoperable. At processing block 404, route manager 200 determines that the routing protocol application is inoperable. At preparatory block 406, route manager 200 starts timer 204.

At decision block 408, route manager 200 determines whether timer 204 has expired. When timer 408 has not expired, route manager 200 waits at delay block 410, then again determines whether timer 208 has expired at decision block 408. When timer 408 has expired, at processing block 412 route manager 200 confirms the routes associated with the routing protocol application. In one embodiment, route manager 200 confirms the routes by determining whether the routing protocol application has rediscovered its routes (i.e., routes previously provided by the routing protocol application that were in route table 202 when the routing protocol application became inoperable).

In one embodiment, each route in route table 202 includes a time stamp to reflect when a routing protocol application provided the route to route manager 200. When a routing protocol application rediscovers the route, route manager 200 updates the time stamp to reflect the time when the routing protocol application rediscovered the route. Thus, in order to determine whether an inoperable routing protocol application rediscovered its routes, route manager 200 determines whether the routing protocol application's routes in route table 200 include a time stamp that was updated after route manager 200 started timer 204. When a route includes a time stamp that was updated after route manager 200 started timer 204, route manager 200 determines that the routing protocol application rediscovered the route. Conversely, when a route does not include a time stamp that was updated after route manager 200 started timer 204, route manager 200 determines that the routing protocol application did not rediscover the route.

For example, if route manager 200 starts timer 204 when a routing protocol application becomes inoperable at 10:00 a.m., and timer 204 runs for two minutes, route manager 200 determines whether the time stamp for each of the inoperable routing protocol application's routes reflects a time between 10:00 a.m. and 10:02 a.m. When a time stamp reflects a time between 10:00 a.m. and 10:02 a.m., route manager 200 determines that the routing protocol application rediscovered the route after route manager 200 started timer 204. However, when the time stamp reflects a time earlier than 10:00 a.m., route manager 200 determines that the routing protocol application did not rediscover the route after route manager 200 started timer 204.

When route manager 200 confirms the routes associated with the routing protocol application, method 400 ends. When route manager 200 is not able to confirm one or more routes associated with the routing protocol application (e.g., because the route's time stamp was not updated), at processing block 414 route manager 200 purges the route(s) it was unable to confirm from route table 202 and from route tables (e.g., subset route table 206 or subsidiary route table 212) containing routes previously distributed by route manager 202.

A route manager receives routes from registered routing protocol applications and maintains routes in a route table. The route manager also distributes routes to the interested routing protocol applications and to other applications that otherwise do not have access to routes and recovers routes corresponding to inoperable routing protocol applications. By performing these tasks, a route manager provides routing protocol applications with access to routes discovered by other routing protocol applications when the routing protocol applications run as separate processes.

Figure 5:
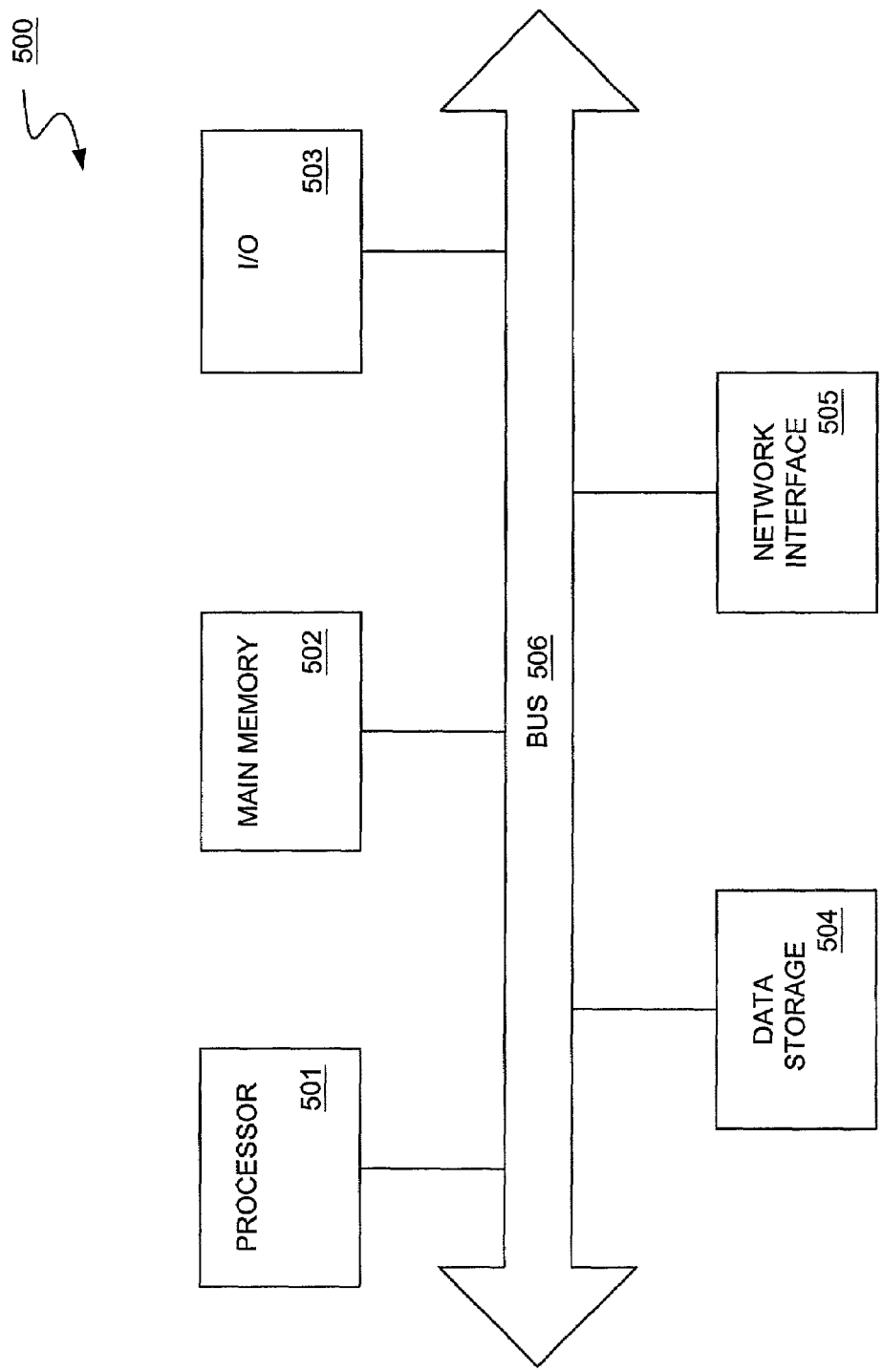
FIG. 5 illustrates one embodiment of a suitable computing environment in which certain aspects of the invention illustrated in FIG. 1, FIG. 2, FIG. 3 and FIG. 4 may be practiced.

FIG. 5 illustrates one embodiment of a suitable computing environment in which certain aspects of the invention illustrated in FIG. 1, FIG. 2, FIG. 3, and FIG. 4 may be practiced. In one embodiment, the method for a route manager 200 may be implemented on a computer system 500 having components 501–506, including a processor 501, a memory 502, an Input/Output device 503, a data storage 504, and a network interface 505, coupled to each other via a bus 508. The components perform their conventional functions known in the art and provide the means for implementing route manager 200. Collectively, these components represent a broad category of hardware systems, including but not limited to general purpose computer systems and specialized packet-forwarding devices.

In one embodiment, memory 502 may include one or more of random access memory (RAM), and nonvolatile storage devices (e.g., magnetic or optical disks) on which are stored instructions and data for use by processor 501, including the instructions and data that comprise route manager 200, timer 204 and other components of route manager 200, as well as routing protocol application A 220, routing protocol application B 222, through routing protocol application N 224.

In one embodiment, data storage 504 may represent route table 202, subset route table 206, and any other storage areas such as packet buffers, etc., used by the router 100 for forwarding network packets or messages.

It is to be appreciated that various components of computer system 500 may be rearranged, and that certain implementations of the present invention may not require nor include all of the above components. Furthermore, additional components may be included in computer system 500, such as additional processors (e.g., a digital signal processor), storage devices, memories, network/communication interfaces, etc.

In the illustrated embodiment of FIG. 5, the method and apparatus for a route manager in accordance with one embodiment of the invention as discussed above may be implemented as a series of software routines executed by computer system 500. The software routines may comprise a plurality or series of instructions, code sequences, configuration information, or other data to be accessed and/or executed by a processing system such as one or more of processor 501. Initially, the series of instructions, code sequences, configuration information, or other data may be stored on a data storage component 504 and transferred to memory 502 via bus 508. It is to be appreciated that the series of instructions, code sequences, configuration information, or other data can be stored on a data storage component 504 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via a network/communication interface 505. The instructions, code sequences, configuration information, or other data may be copied from the data storage component 504, such as mass storage, or from the propagated data signal into memory 502 and accessed and executed by processor 501.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for a method and apparatus for a route manager. From the foregoing description, those skilled in the art will recognize that many other variations of the present invention are possible. In particular, while the present invention has been described as being implemented in a network comprising one or more routers 100, some of the logic may be distributed in other components of a network or internetwork application. Thus, the present invention is not limited by the details described. Instead, the present invention can be practiced with modifications and alterations within the spirit and scope of the appended claims.

What is claimed is:

1. A method for managing routes in a packet switched network, the method comprising:
    receiving in a user space of a network device in a packet switched network a route to a destination, the route having been discovered by a routing protocol application;

maintaining the route in a route table in the user space; and distributing the route from the route table in the user space to a second routing protocol application.

2. The method of claim 1, further comprising:
maintaining a subset of routes in a second route table in a high-speed forwarding space of the network device.

3. The method of claim 2, wherein the subset comprises routes determined to be the best route to each of the destinations.

4. The method of claim 1, further comprising:
distributing the route from the route table in the user space to a subsidiary application not having access to the routing protocol applications.

5. The method of claim 4, wherein the subsidiary application maintains the distributed route in a subsidiary route table in the user space.

6. The method of claim 4, wherein distributing the route further comprises distributing a subset of routes in bulk from the route table in the user space to the subsidiary application.

7. The method of claim 6, wherein the subset of routes comprises routes determined to be the best route to each of the destinations.

8. The method of claim 6, wherein the subset of routes comprises routes associated with the same routing protocol application.

9. The method of claim 6, wherein the subset of routes comprises routes associated with at least one of a group of destinations.

10. The method of claim 6, wherein the subset of routes comprises routes associated with a best route to at least one of a group of destinations.

11. The method of claim 1, further comprising recovering the route when the routing protocol application is inoperable.

12. The method of claim 11, wherein recovering includes:
setting a timer when the routing protocol application becomes inoperable; and
purging the route from the route table in the user space when the route cannot be confirmed upon expiration of the timer.

13. The method of claim 12, wherein the route cannot be confirmed when the route is not rediscovered upon expiration of the timer.

14. The method of claim 12, wherein the route cannot be confirmed when a time stamp of the route is not updated after setting the timer.

15. A method for managing routes in a packet switched network, the method comprising:
receiving in a user space of a network device in a packet switched network a route to a destination, the route having been discovered by a routing protocol application;
maintaining the route in a route table in the user space; and
distributing the route from the route table in the user space to a subsidiary application not having access to the routing protocol application.

16. The method of claim 15, wherein the subsidiary application maintains the distributed route in a subsidiary route table in the user space.

17. The method of claim 15, wherein distributing the route further comprises distributing a subset of routes in bulk from the route table in the user space to the subsidiary application.

18. The method of claim 17, wherein the subset of routes comprises routes determined to be the best route to each of the destinations.

19. The method of claim 17, wherein the subset of routes comprises routes associated with the same routing protocol application.

20. The method of claim 17, wherein the subset of routes comprises routes associated with at least one of a group of destinations.

21. A method for managing routes in a packet switched network the method comprising:
receiving in a user space of a network device in a packet switched network a route to a destination, the route having been discovered by a routing protocol application;
maintaining the route in a route table in the user space; and
recovering the route in the route table in the user space when the routing protocol application is inoperable.

22. The method of claim 21, wherein recovering includes:
setting a timer when the routing protocol application becomes inoperable; and
purging the route from the route table in the user space when the route cannot be confirmed upon expiration of the timer.

23. The method of claim 22, wherein the route cannot be confirmed when the route is not rediscovered upon expiration of the timer.

24. The method of claim 22, wherein the route cannot be confirmed when a time stamp of the route is not updated after setting the timer.

25. A system for managing routes in a packet switched network, the system comprising:
an input receiver to receive, in a user space of a switching device in a packet switched network, a route to a destination in the network, the route having been discovered by a routing protocol application;
a processing system to generate a route table in the user space of the switching device based on a received route and to distribute the received route from the route table in the user space to a second routing protocol application.

26. The system of claim 25, wherein the processing system maintains a subset of routes in a second route table in a high-speed forwarding space of the switching device.

27. The system of claim 26, wherein the subset of routes comprises routes determined to be the best route to each of the destinations.

28. The system of claim 25, wherein the processing system distributes the route from the route table in the user space to a subsidiary application not having access to the routing protocol application.

29. The system of claim 28, wherein the processing system maintains the distributed route in a subsidiary route table in the user space.

30. The system of claim 28, wherein distributing the route further comprises distributing a subset of routes in bulk from the route table in the user space to the subsidiary application.

31. The system of claim 30, wherein the subset of routes comprises routes determined to be the best route to each of the destinations.

32. The system of claim 30, wherein the subset of routes comprises routes associated with the same routing protocol application.

33. The system of claim 30, wherein the subset of routes comprises routes associated with at least one of a group of destinations.

34. The system of claim 30, wherein the subset of routes comprises routes associated with a best route to at least one of a group of destinations.

35. The system of claim 25, wherein the processing system recovers the route when the routing protocol application is inoperable.

36. The system of claim 35, wherein recovering includes:
   setting a timer when the routing protocol application becomes inoperable; and
   purging the route from the route table in the user space when the route cannot be confirmed upon expiration of the timer.

37. The system of claim 36, wherein the route cannot be confirmed when the route is not rediscovered upon expiration of the timer.

38. The system of claim 36, wherein the route cannot be confirmed when a time stamp of the route is not updated after setting the timer.

39. An apparatus for managing routes in a packet switched network, the apparatus comprising:
   a route manager operating in a user space of the apparatus to receive a route to a destination, the route having been discovered by a routing protocol application, maintain the route in a route table in the user space, and distribute the route from the route table in the user space to a second routing protocol application; and
   the route table in the user space containing the route.

40. The apparatus of claim 39, further comprising:
   a second route table in a fast switching space of the apparatus containing a subset of routes present in the route table in the user space, the subset of routes having been determined by the route manager.

41. The apparatus of claim 40, wherein the subset of routes comprises routes determined to be the best route to each of the destinations.

42. The apparatus of claim 39, further comprising:
   a subsidiary application not having access to the routing protocol application, the route manager distributing the route from the route table in the user space to the subsidiary application.

43. The apparatus of claim 42, further comprising:
   a subsidiary route table in the user space containing the distributed route, the subsidiary route table being maintained by the subsidiary application.

44. The apparatus of claim 42, wherein the route manager distributes a subset of routes in bulk from the route table in the user space to the subsidiary application.

45. The apparatus of claim 44, wherein the subset of routes comprises routes determined to be the best route to each of the destinations.

46. The apparatus of claim 44, wherein the subset of routes comprises routes associated with the same routing protocol application.

47. The apparatus of claim 44, wherein the subset of routes comprises routes associated with at least one of a group of destinations.

48. The apparatus of claim 39, wherein the route manager recovers the route when the routing protocol application is inoperable.

49. The apparatus of claim 48, further comprising:
   a timer, the route manager to start the timer when the routing protocol application becomes inoperable and purge the route from the route table in the user space when the route cannot be confirmed upon expiration of the timer.

50. The apparatus of claim 49, wherein the route cannot be confirmed when the route is not rediscovered upon expiration of the timer.

51. The apparatus of claim 49, wherein the route cannot be confirmed when a time stamp of the route is not updated after the route manager starts the timer.

* * * * *